(12) United States Patent
Driscoll

(10) Patent No.: US 6,760,440 B1
(45) Date of Patent: Jul. 6, 2004

(54) ONE'S COMPLEMENT CRYPTOGRAPHIC COMBINER

(75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/460,182

(22) Filed: Dec. 11, 1999

(51) Int. Cl.$^7$ ............................. H04K 1/02; G09C 1/06
(52) U.S. Cl. ........................................................ 380/37
(58) Field of Search ............................. 713/168; 380/3, 380/37, 42–44, 277; 375/240, 260; 340/347

(56) References Cited

U.S. PATENT DOCUMENTS

| | | | | |
|---|---|---|---|---|
| 4,092,491 A | * | 5/1978 | Frazer | 375/283 |
| 4,264,782 A | * | 4/1981 | Konheim | 705/75 |
| 4,389,636 A | * | 6/1983 | Riddle, Jr. | 341/71 |
| 4,979,832 A | * | 12/1990 | Ritter | 380/28 |
| 5,307,409 A | | 4/1994 | Driscoll | 380/2 |
| 5,444,781 A | | 8/1995 | Lynn et al. | |
| 5,483,598 A | | 1/1996 | Kaufman et al. | |
| 5,703,952 A | * | 12/1997 | Taylor | 380/44 |
| 5,717,760 A | * | 2/1998 | Satterfield | 380/28 |
| 6,298,136 B1 | * | 10/2001 | Den Boer | 380/29 |

OTHER PUBLICATIONS

Menezes, Alfred J., Handbook of Applied Cryptography, CRC Press, pp. 7–8.*

* cited by examiner

*Primary Examiner*—Gregory Morse
*Assistant Examiner*—Mossadeq Zia
(74) *Attorney, Agent, or Firm*—Kris T. Fredrick

(57) ABSTRACT

A stream cipher cryptosystem includes a pseudo-random number generator receiving a key and providing a keystream. A cryptographic combiner combines a first binary data sequence and the keystream with a one's complement operation to provide a second binary data sequence. In encryption operations, the cryptographic combiner is an encryption combiner and the first binary data sequence is a plaintext binary data sequence and the second binary data sequence is a ciphertext binary data sequence. In decryption operations, the cryptographic combiner is a decryption combiner and the first binary data sequence is a ciphertext binary data sequence and the second binary data sequence is a plaintext binary data sequence.

37 Claims, 3 Drawing Sheets

ONE'S COMPLEMENT CRYPTOGRAPHIC COMBINER

THE FIELD OF THE INVENTION

The present invention generally relates to cryptosystems, and more particularly relates to private-key stream cipher cryptosystems which combine a keystream with plaintext to encrypt the plaintext into ciphertext and combine the ciphertext with a keystream to decipher the ciphertext into plaintext.

BACKGROUND OF THE INVENTION

Cryptosystems perform cryptography to transform plaintext into ciphertext so that only an authorized receiver can transform the ciphertext back into the original plaintext. Encryption or enciphering is the process that transforms plaintext into ciphertext. Decryption or deciphering is the process that transforms ciphertext into plaintext.

A parameter called an encryption key is employed by a cryptosystem to prevent the plaintext from being easily revealed by an unauthorized person. A sender transforms a given plaintext into a large variety of possible ciphertext selected by the specific encryption key. A receiver of the ciphertext deciphers the ciphertext by employing a parameter referred to as a decryption key. In a public-key cryptosystem, the encryption key is made public while the decryption key is kept secret. Therefore, in public key cryptosystems, the decryption key must be computationally infeasible to deduce from the encryption key. In a private-key cryptosystem, the sender and the receiver typically share a common key that is used for both enciphering and deciphering. In such a private-key cryptosystem, the common key is alterable and must be kept secret.

Private-key cryptosystems are typically implemented as block cipher cryptosystems or stream cipher cryptosystems. Block cipher cryptosystems divide the plaintext into blocks and encipher each block independently using a stateless transform. In block cipher cryptosystems if one fixed common private-key is employed to encipher different occurrences of a particular plaintext block, all of these occurrences are encrypted into identical corresponding ciphertext blocks. Therefore, the block size is preferably selected to be large enough to frustrate attacks from a cryptanalyst, which analyzes the occurrence frequencies of various patterns among the ciphertext blocks. Example block sizes are 64 bits and 128 bits.

In stream cipher cryptosystems, the plaintext is typically encrypted on a bit-by-bit or word-by-word basis using a stateful transform that evolves as the encryption progresses. In encrypting the plaintext binary data sequence for transmission as a ciphertext binary data sequence, the common private-key is a parameter which controls a pseudo-random number generator to create a long sequence of binary data referred to as a key stream. The stream cipher cryptosystem includes a cryptographic combiner which combines the keystream with the plaintext sequence. The cryptographic combiner is typically implemented with exclusive-or (XOR) bit-wise logic gates which perform bit-wise modulo-2 addition. The cryptographic combiner produces the ciphertext. At the receiver, the common private-key controls a receiver pseudo-random number generator to produce a decryption keystream. The decryption keystream is combined with a decryption combiner to decrypt the ciphertext to provide the plaintext to the receiver.

One problem with stream cipher cryptosystems is the difficulty of generating a long, statistically uniform, and unpredictable sequence of binary data in the keystream from a short and random key. Such sequences are desirable in the keystream in cryptography to make it impossible, given a reasonable segment of its data and sufficient computer resources, to find out more about the sequences.

There are four general requirements for cryptographically secure keystream pseudo-random number generators. First, the period of a keystream must be large enough to accommodate the length of the transmitted message. Second, the keystream output bits must have good statistical properties (e.g. values are uniformally distributed). Third, the keystream output bits must be easy to generate. Fourth, the keystream output bits must be hard to predict. For example, given the pseudo-random number generator and the first N output bits, $a(0), a(1), \ldots, a(N-1)$, it should be computationally infeasible to predict the $(N+1)^{th}$ bit $a(N)$ in a sequence with better than a 50—50 chance. In otherwords, a cryptanalyst should not be able to generate other forward bits or backward bits if presented with a given portion of the keystream output sequence.

The receiver decryption combiner operation must be the inverse of the sender encryption combiner operation so that the same keystream can be used to encrypt the plaintext at the sender to form the ciphertext and decrypt the ciphertext at the receiver to form the plaintext. The most common combiner operation is bit-wise XOR. One problem with the XOR combiner operation is that an accidental double encryption causes all of the plaintext to become visible. Another problem with the XOR combiner operation is that two ciphertext using the same key can be XORed together by a cryptanalyst to eliminate the keystream and leave the XOR of two plaintext. The low entropy of languages, such as the English language, allows for the XOR of two plaintexts to be resolved into its two original plaintext messages. Furthermore, if the keystream period is smaller than a message, this type of cryptanalysis also can be performed by dividing a ciphertext message into portions the size of the keystream and XORing the portions together to eliminate the keystream and leave the XOR of the plaintext portions.

A cryptographic combiner using a two's compliment addition combiner operation has problems similar the XOR combiner operation. Accidental double encryption causes the least significant bit of each plaintext unit to become visible. In many cases, cryptanalysis can be performed to break the cipher with just the least significant bit of the plaintext being visible. Moreover, adding together $2^N$ ciphertexts encrypted in the same keystream eliminates the key from the bottom N bits of each text unit and leaves the sum of $2^N$ plaintexts for these bits. The low entropy of languages, such as the English language, often allow these N bits to be resolved into the N original plaintext messages, which in many cases can be used by a cryptanalyst to break a cipher. For example, cryptanalysis can be performed by dividing a ciphertext message into N pieces and adding the N pieces together.

Another problem with the XOR combiner operation is that it allows an adversary to manipulate the contents of the message with only trivial information about its structure. If an adversary wants to change some bit(s) in the received plaintext, all that need be done is to intercept the ciphertext message, invert the ciphertext bit(s) corresponding to the plaintext bit(s) the adversay wants to change, and then send the message on to the receiver. The only knowledge that an adversary needs is the location within the message of the bit(s) to be changed. A two's complement combiner makes the manipulation a little more difficult in that the adversary will need to know the plaintext of all bits above (more significant than) the bit(s) to be changed. This knowledge is needed so the adversary can make the desired changes without carry or borrow changing other bits of the message that the adversary doesn't want changed.

Some very complex cryptographic combiners solve some of the above-problems with the XOR combiner operation. These very complex cryptographic combiners are, however, quite expensive in terms of time and/or hardware resources. One example cryptographic combiner in this very complex category is a permutation table combiner. The permutation table is required to have a table the size of the plaintext alphabet. For example, if the plaintext unit size is 32 bits, the permutation table needs to be 16 gigabytes. On the other hand, if the plaintext unit size is 8 bits, the permutation table size is only required to be 256 bytes, but encrypting 8 bit plaintext units is typically 4 times slower than using 32 bit plaintext units. In addition, the smaller plaintext unit size limits the amount of plaintext diffusion. Plaintext diffusion means that plaintext bits can effect the encryption of other plaintext bits. For example, the XOR combiner operation has no plaintext diffusion.

Often, the ciphertext produced by encryption must not contain a value that is reserved to mean end-of-string, end-of-message, or end-of-file. For example, a text string in the C programming language cannot contain a zero byte because that value is reserved to mean end-of-string. The simple XOR and two's complement combiners can produce any ciphertext value. This means that extra effort must be applied to prevent the reserved values from appearing within the ciphertext.

For reasons stated above and for other reasons presented in greater detail in the Description of the Preferred Embodiments section of the present specification, a cryptographic combiner is desired for stream cipher cryptosystems wherein accidental double encryption does not remove the keystream from the combined output bits. In addition, there is a need for a cryptographic combiner where the same keystream cannot be used to combine two ciphertext to eliminate the keystream and leave the combiner operation of the two original plaintext messages. In addition, there is a need for a cryptographic combiner that produces ciphertext which is known not to contain some reserved value. Such a desired cryptographic combiner should be relatively inexpensive in time and hardware resources.

SUMMARY OF THE INVENTION

The present invention provides a stream cipher cryptosystem including a pseudo-random number generator receiving a key and providing a keystream. The stream cipher cryptosystem also includes a cryptographic combiner receiving a first binary data sequence and the keystream. The cryptographic combiner performs a one's complement operation on the first binary data sequence and the keystream to provide a second binary data sequence.

In encryption operations, the cryptographic combiner is an encryption combiner and the first binary data sequence is a plaintext binary data sequence and the second binary data sequence is a ciphertext binary data sequence. In decryption operations, the cryptographic combiner is a decryption combiner and the first binary data sequence is a ciphertext binary data sequence and the second binary data sequence is a plaintext binary data sequence.

In one embodiment, the one's complement operation is a one's complement addition operation. In another embodiment, the one's complement operation is a one's complement subtraction operation. In one embodiment, the stream cipher cryptosystem includes a controller for controlling the cryptographic combiner to select the one's complement operation from an addition operation and a subtraction operation. In one embodiment, the controller controls the cryptographic combiner to pseudo-randomly select between the addition operation and the subtraction operation. In one embodiment, the controller controls the cryptographic combiner to select between the addition operation and the subtraction operation based on the amount of text currently processed.

In one embodiment, the cryptographic combiner is implemented in software and the one's complement operation is an addition operation performed by a two's complement addition. In this embodiment, a constant is added with an ADD WITH CARRY instruction to convert the two's complement answer to a one's complement answer. In one embodiment, the constant used with an ADD WITH CARRY instruction is selected such that the ciphertext does not contain a reserved value. In another embodiment where the cryptographic combiner is implemented in software, the one's complement operation is a subtraction operation performed by a two's complement subtraction. In this embodiment, a constant is subtracted with a SUBTRACT WITH BORROW instruction to convert the two's complement answer to a one's complement answer. In one embodiment, the constant used with a SUBTRACT WITH BORROW instruction is selected such that the ciphertext does not contain a reserved value.

In one form of the present invention, a stream cipher cryptosystem includes an encryption pseudo-random number generator receiving a key and providing an encryption keystream. An encryption combiner receiving a first plaintext binary data sequence and the encryption keystream. The encryption combiner performs a first one's complement operation on the first plaintext binary data sequence and the encryption keystream to provide a ciphertext binary data sequence. A decryption pseudo-random number generator receives the key and provides a decryption keystream. A decryption combiner receives the ciphertext binary data sequence and the decryption keystream. The decryption combiner performing a second one's complement operation on the ciphertext binary data sequence and the decryption keystream to provide a second plaintext binary data sequence substantially similar to the first plaintext binary data sequence. In this form of the present invention, the second one's complement operation is preferably the inverse of the first one's complement operation.

The stream cipher cryptosystem according to the present invention includes one's complement cryptographic combiner wherein accidental double encryption does not remove the keystream from the combined output bits. In the one's complement cryptographic combiner operation according to the present invention, the same keystream cannot be used to combine two ciphertext to eliminate the keystream and leave the combiner operation of the two original plaintext messages. Nevertheless, the one's complement cryptographic combiner operation according to the present invention requires a minimal increase of resources over a conventional XOR combiner operations.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
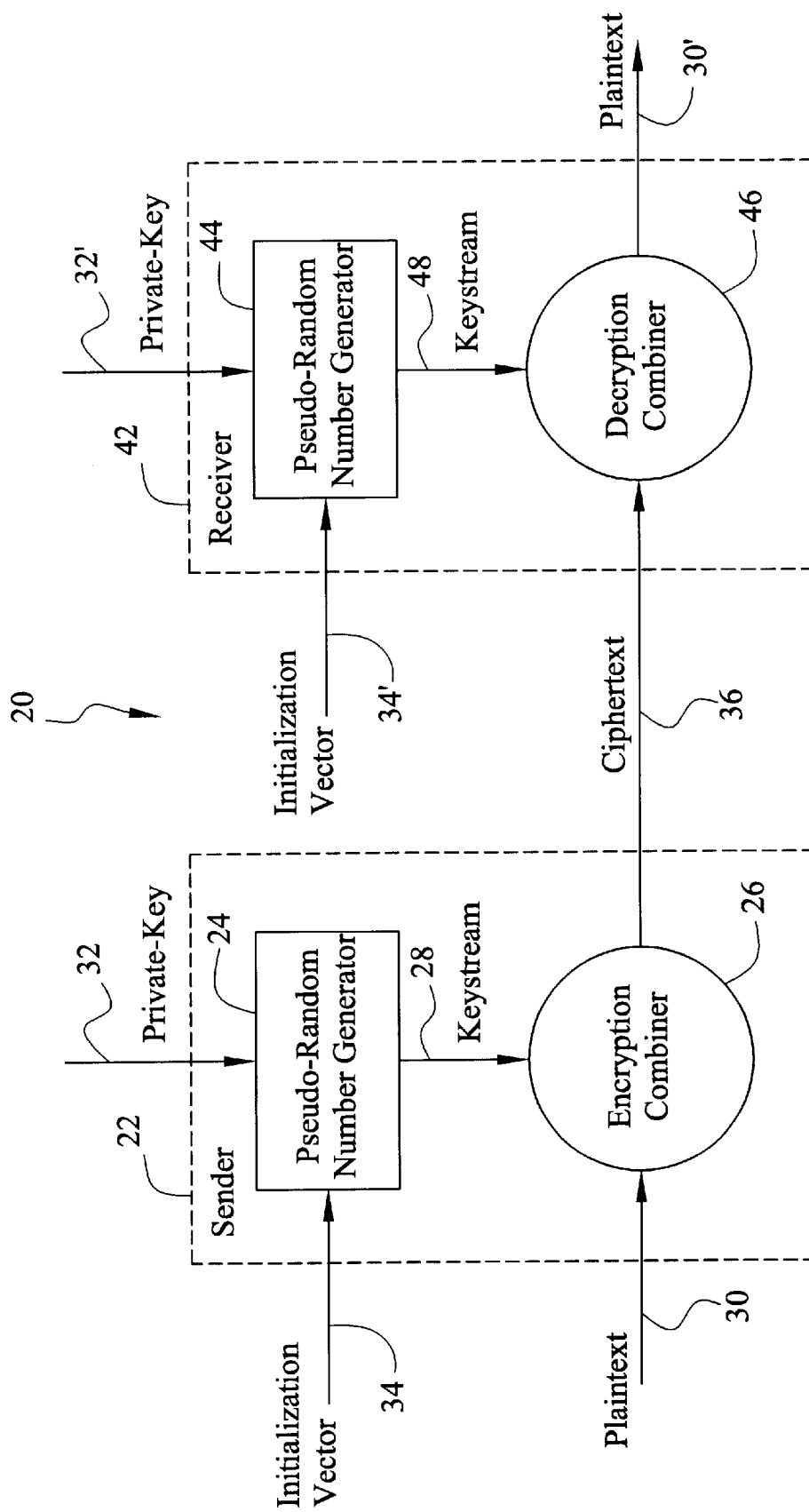
FIG. 1 is a block diagram of a cryptosystem according to the present invention.

A private-key stream cipher cryptosystem according to the present invention is illustrated generally at 20 in FIG. 1 in block diagram form. Stream cipher cryptosystem 20 includes a sender 22, such as a computer system, and a receiver 42, such as a computer system.

Sender 22 includes a pseudo-random number generator 24 and an encryption combiner 26. Pseudo-random number generator 24 receives a private-key 32 which controls pseudo-random number generator 24 to produce an encryption keystream 28 to be provided to encryption combiner 26. In the embodiment illustrated in FIG. 1, an initialization vector 34 is also provided to pseudo-random number generator 24 to ensure that encryption keystream 28 is not the same even if the same private-key 32 is used to control pseudo-random number generator 24 for multiple messages. Initialization vector 34 can be embodied as a sequence number to ensure that every message which is encrypted is slightly different.

Plaintext 30 is also provided to encryption combiner 26. Plaintext 30 is a binary data sequence. Encryption combiner 26 combines plaintext 30 and encryption keystream 28 to form ciphertext 36, which is also a binary data sequence.

Receiver 42 includes pseudo-random number generator 44 and decryption combiner 46. Pseudo-random number generator 44 receives private-key 32', which is the same private-key as the private-key 32. Pseudo-random number generator 44 is controlled by private-key 32' to produce keystream 48, which is provided to decryption combiner 46. In the embodiment illustrated in FIG. 1, an initialization vector 34' which is the same initialization vector as initialization vector 34 is provided to pseudo-random number generator 44 to ensure that decryption keystream 48 is identical to encryption keystream 28 for a given private key 32/32' and initialization vector 34/34'.

Decryption combiner 46 receives ciphertext 36 and combines ciphertext 36 with decryption keystream 48 to produce plaintext 30', which is a binary data sequence which substantially matches plaintext 30.

There are many known pseudo-random number generators which are suitable for pseudo-random number generator 24 and pseudo-random number generator 44. As mentioned in the Background of the Invention section of the present specification, pseudo-random number generators 24 and 44 should have the following general characteristics to produce cryptographically secure keystreams 28 and 48. First, the period of a keystream must be large enough to accommodate the length of the transmitted message. Second, the keystream output bits must be easy to generate. Third, the keystream output bits must be hard to predict.

Figure 2:
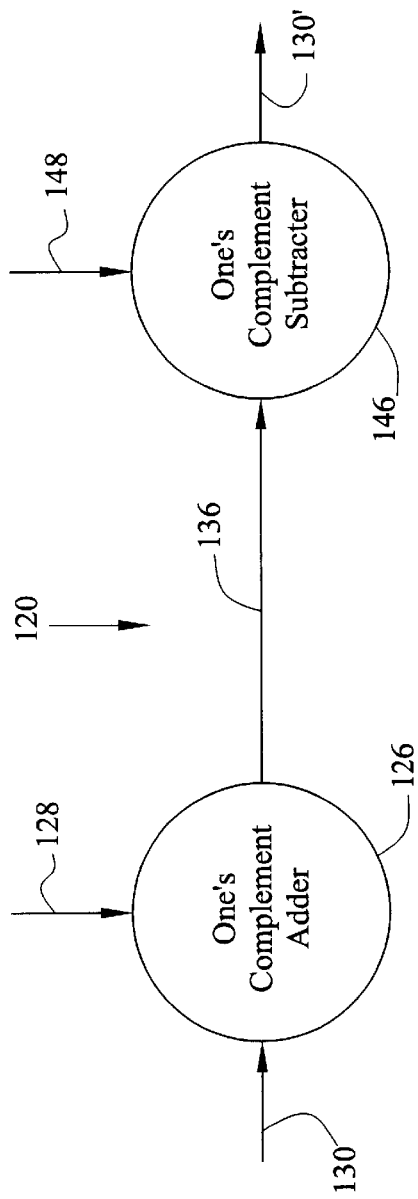
FIG. 2 is one embodiment of a cryptosystem according to the present invention having a one's complement adder encryption combiner operation and a one's complement subtracter decryption operation.

One embodiment of a portion of a cryptosystem according to the present invention is illustrated generally at 120 in FIG. 2. Cryptosystem 120 includes a pair of one's complement cryptographic combiners 126 and 146. In this embodiment, one's complement encryption combiner 126 is implemented as a one's complement adder. Correspondingly, in this embodiment, one's complement decryption combiner 146 is implemented as a one's compliment subtracter. Thus, one's complement encryption combiner 126 adds an encryption keystream 128 to plaintext 130 to provide ciphertext 136. One's complement decryption combiner 146 subtracts decryption keystream 148 from ciphertext 136 to provide plaintext 130'. Decryption keystream 148 is identical to keystream 128. Plaintext 130' is substantially similar to plaintext 130.

Figure 3:
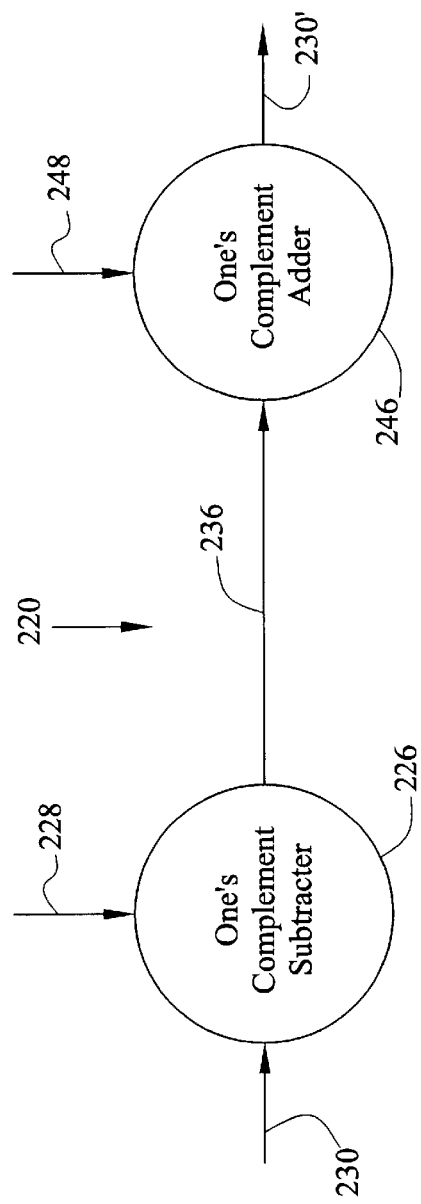
FIG. 3 is a block diagram of a cryptosystem according to the present invention having a one's complement subtracter encryption combiner operation and a one's complement adder decryption combiner operation.

One embodiment of a portion of a cryptosystem according to the present invention is illustrated generally at 220 in FIG. 3. Cryptosystem 220 includes a pair of one's complement cryptographic combiners 226 and 246. In this embodiment, one's complement encryption combiner 226 is implemented as a one's complement subtracter. Correspondingly, in this embodiment, one's complement decryption combiner 246 is implemented as a one's compliment adder. Thus, one's complement encryption combiner 226 substracts a decryption keystream 228 from plaintext 230 to provide ciphertext 236. One's complement encryption combiner 246 adds decryption keystream 248 to ciphertext 236 to provide plaintext 230'. Decryption keystream 248 is identical to keystream 228. Plaintext 230' is substantially similar to plaintext 230.

Thus, stream cipher cryptosystem 120 of FIG. 2 uses one's complement addition to combine pseudo-random encryption keystream 128 with plaintext 130 to produce ciphertext 136 and uses the inverse one's complement subtraction operation to combine decryption keystream 148 with ciphertext 136 to produce plaintext 130'. Stream cipher cryptosystem 220, on the other hand, uses one's complement subtraction to combine pseudo-random encryption keystream 228 with plaintext 230 to produce ciphertext 236 and uses the inverse one's complement addition operation to combine decryption keystream 248 with ciphertext 236 to produce plaintext 230'.

The choice of using one's complement addition or one's complement subtraction for encryption may depend on the characteristics of the incoming plaintext 130/230. If it is known that one of the plaintext bits is a fixed zero bit, then one's complement subtraction is selected, such as in cryptosystem 220. An example of plaintext which has a fixed zero bit is a N bit word packed with M no-parity ASCII bytes, which always have a 0 as the most significant bit (MSb) of each byte. The choice of using one's complement subtraction when there is a fixed zero bit in the plaintext is made because a zero bit in the keystream 228 corresponding to the fixed plaintext zero bit produces a borrow out of that bit position with a one's complement subtraction operation. By contrast, a zero bit in the keystream corresponding to the fixed plaintext zero bit with a one's complement addition operation produces no carry out of that bit position. It is desired to have a carry or borrow possible for each bit position because the carry or borrow produces diffusion among the plaintext bits. Plaintext diffusion means that plaintext bits can effect the encryption of other plaintext bits.

Similarly, if it is known that one of the plaintext unit bits is a fixed one bit, then one's complement addition is used for the encryption combiner operation, such as in cryptosystem 120. If there is a one bit in the encryption keystream corresponding to the fixed plaintext one bit, one's complement addition produces a carry-out of that bit position. By contrast, if there is a one bit in the keystream corresponding to the fixed plaintext one bit, one's complement subtraction does not produce a borrow out of that bit position.

Figure 4:
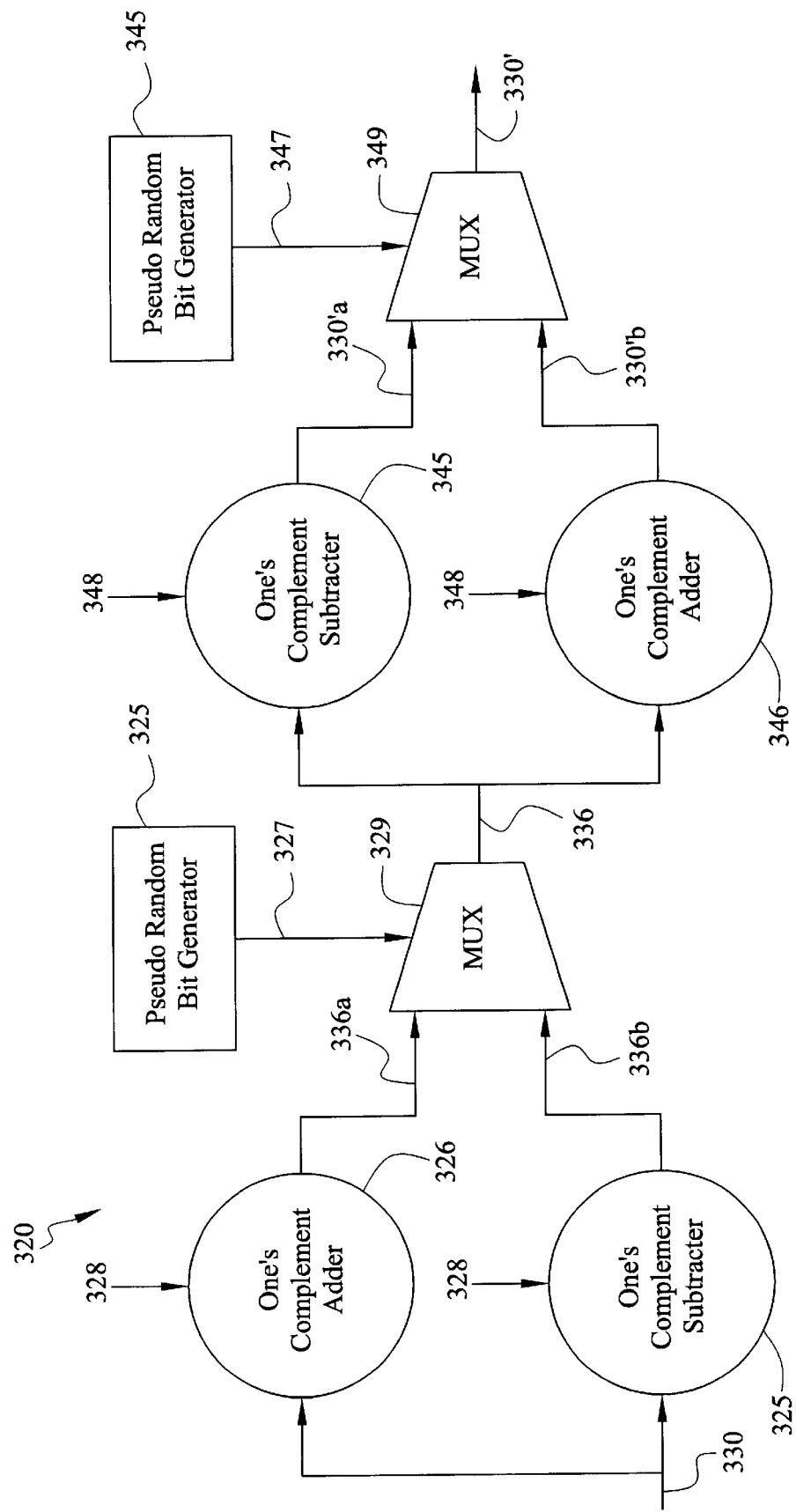
FIG. 4 is an embodiment of a cryptosystem according to the present invention including a one's complement combiner operation which is controlled by a pseudo-random number generator to provide either a one's complement addition operation or a one's complement subtraction operation.

An alternative embodiment of a portion of a cryptosystem according to the present invention is illustrated generally at 320 in FIG. 4. Stream cipher cryptosystem 320 includes a one's complement adder encryption combiner 326 which receives plaintext 330 and encryption keystream 328 and performs a one's complement addition operation to provide ciphertext 336a. Stream cipher cryptosystem 320 also includes a one's complement substracter encryption combiner 325 which receives plaintext 330 and encryption keystream 328 and performs a one's complement subtraction operation to provide ciphertext 336b. Ciphertext 336a and ciphertext 336b are provided as data inputs to a multiplexer 329. A pseudo-random number generator 325 produces a pseudo-random number sequence 327 which is provided as a select input to multiplexor 329. In this way, pseudo-random switching, as controlled by pseudo-random number sequence 327, is used to determine whether ciphertext 336a or ciphertext 336b is provided as ciphertext 336 from multiplexer 329 to thereby control whether keystream 328 is subtracted from or added to plaintext 330 to produce ciphertext 336.

Stream cipher cryptosystem 320 includes a one's complement adder decryption combiner 346 which receives ciphertext 336 and decryption keystream 348 and performs a one's complement addition operation to provide plaintext 330'a. Stream cipher cryptosystem 320 also includes a one's complement subtracter decryption combiner 345 which receives ciphertext 336 and decryption keystream 348 and performs a ones' complement subtraction operation to provide plaintext 330'b. Plaintext 330'a and plaintext 330'b are provided as data inputs to a multiplexer 349. A pseudo-random number generator 345 produces a pseudo-random number sequence 347, which is identical to pseudo-random number sequence 327, and which is provided as a select input to multiplexer 349. In this way, pseudo-random switching, as controlled by pseudo-random number sequence 347, is used to determine whether plaintext 330'a or plaintext 330'b is output from multiplexer 349 as plaintext 330' to thereby control whether keystream 348 is subtracted from or added to ciphertext 336 to produce plaintext 330'.

As illustrated in FIG. 4, the output sequence 327 from pseudo-random number generator 325 is identical to the output sequence 347 from pseudo-random number generator 345, but one's complement adder encryption combiner 326 is provided to the "a" input of multiplexer 329 while the one's complement adder decryption combiner 346 is provided to the "b" input of multiplexer 349 and the one's complement subtracter encryption combiner 325 is provided to "b" input of multiplexer 329 while the one's complement subtracter decryption combiner 345 is provided to the "a" input of multiplexer 349. This ensures that the decryption combiner operation performed to decrypt ciphertext 336 into plaintext 330' is the inverse of the encryption combiner operation performed to encrypt plaintext 330 into ciphertext 336.

The embodiment of cryptosystem 320 illustrated in FIG. 4 is employed in situations where both known fixed ones bits and fixed zero bits occur in the plaintext. In any of the above embodiments represented by cryptosystems 120, 220, and 320, for each plaintext unit, the decryption one's complement combiner operation must be the inverse of the encryption one's complement combiner operation.

In an alternative embodiment of cryptosystem 320, controllers (not shown) control multiplexer 329 and multiplexer 349 to select between the one's complement addition operation and the one's complement subtraction operation based on the amount of text currently processed.

The one's complement combiner operation according to the present invention performs one's complement addition and subtraction which is substantially the same complexity as an exclusive-or (XOR) or a two's complement addition operation. Even in software on a two's complement computer, a one's complement operation only requires two instructions verses one instruction for a XOR operation or two's complement operation, which is much better than the several instructions and large tables required by more complex combiners. As to the hardware implementation of the one's complement combiner, one's complement and two's complement hardware adders are approximately the same size. It should be noted that the above-block diagrams of FIGS. 2, 3, and 4 are for illustrative purposes only and that the one's complement combiner accordingly to the present invention can be implemented in either hardware or software.

As to the software embodiment, most of today's computer systems employ two's complement arithmetic. In these type of two's complement arithmetic computer systems, operands for addition and subtraction by one's complement operations must be converted to one's complement form. Nonetheless, most of today's computer systems implement ADD WITH CARRY and SUBTRACT WITH BORROW instructions to implement extended precision math. The ADD WITH CARRY and SUBTRACT WITH BORROW instructions can be used for conversion to one's complement operations. For example, in software, after performing a two's complement addition, adding a constant with an ADD WITH CARRY instruction converts the two's complement answer to a one's complement answer. In one embodiment, the constant used with an ADD WITH CARRY instruction is selected such that the ciphertext does not contain a reserved value. Similarly, after performing a two's complement subtraction, subtracting a constant with a SUBTRACT WITH BORROW instruction converts the two's complement answer to a one's complement answer. In one embodiment, the constant used with a SUBTRACT WITH BORROW instruction is selected such that the ciphertext does not contain a reserved value.

A cryptosystem according to the present invention, such as cryptosystems 20, 120, 220, and 320, employs one's complement cryptographic combiners which overcome problems with XOR and two's complement addition combiners as discussed in the Background of the Invention section of the present specification. For example, accidental double encryption does not remove the keystream from any of the bits. In addition, a cryptanalyst is given no additional information after accidental double encryption, unless both the single encrypted and the double encrypted messages are both available. Even in this situation, the one's complement combiner operation yields less direct information then an XOR or a two's complement combiner operation. Similarly, adding multiple identical keyed messages together with the one's complement combiner operation does not remove any key. Furthermore, plaintext diffusion from the upper bits of a plaintext unit propagates into the lower bits yielding better plaintext diffusion with the one's complement combiner operation according to the present invention. In fact, one advantage of the one's complement combiner operation is that there is a 50% probability that there is a wrap-around carry in the operation. Because of this characteristic of the one's complement combiner operation, the cryptanalyst cannot decipher the least significant bit (LSB) of the ciphertext data stream even if accidental double encryption occurs. Since the one's complement combiner operation is substantially the same complexity as the XOR and the two's complement addition combiner operations, there is not the extensive expense in time, hardware and/or software resources of conventional very complex combiner operations.

One issue with the one's complement combiner operation is that there are two types of zero in one's complement format. A +0 is represented by bit pattern "00 . . . 00" while a –0 is represented by a bit pattern "11 . . . 11". Both the + and – zeros behave as the identity. This situation creates a problem for the inverse of the combiner function to determine which zero to use. Thus, the one's complement cryptographic combiners according to the present invention utilize a one's complement format which eliminates one of the types of zero from the input plaintext. For most plaintext alphabets this is not a problem because most plaintext alphabets do not have bit patterns representing both types of zeros. For example, C language can not have +0 inside text streams. As another example, in ASCII and most ISO character sets, –0 is the control character for deleting the previous character, and as such, –0 is not used to represent text. One example problem occurs with unencoded binary plaintext where both +0 and –0 are legal in the plaintext input. Therefore, the one's complement combiner operation is not suitable for unencoded binary plain text where both +0 and –0 are legal text streams in the plaintext input. However, if any plaintext input permits elimination of either –0 or +0 plaintext input streams, then the one's complement combiner operation according to the present invention can be employed in the cryptosystem according to the present invention.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A stream cipher cryptosystem comprising:
    an encryption pseudo-random number generator receiving a key and providing an encryption keystream;
    an encryption combiner receiving a first plaintext binary data sequence representing a message and the encryption keystream and performing a first one's complement operation on the first plaintext binary data sequence and the encryption keystream to provide a ciphertext binary data sequence;
    a decryption pseudo-random number generator receiving the key and providing a decryption keystream; and
    a decryption combiner receiving the ciphertext binary data sequence and the decryption keystream and performing a second one's complement operation on the ciphertext binary data sequence and the decryption keystream to produce a second plaintext binary data sequence that represents the message represented by the first plaintext binary data sequence.

2. The stream cipher cryptosystem of claim 1 wherein the second one's complement operation is the inverse of the first one's complement operation.

3. The stream cipher cryptosystem of claim 1 wherein the first one's complement operation is a one's complement addition operation and the second one's complement operation is a one's complement subtraction operation.

4. The stream cipher cryptosystem of claim 1 wherein the first one's complement operation is a one's complement subtraction operation and the second one's complement operation is a one's complement addition operation.

5. The stream cipher cryptosystem of claim 1 further comprising:
    means for controlling the encryption combiner to select the first one's complement operation from an addition operation and a subtraction operation; and
    means for controlling the decryption combiner to select the second one's complement operation to be the inverse of the selected first one's complement operation.

6. The stream cipher cryptosystem of claim 5 wherein the means for controlling the encryption combiner pseudo-randomly selects between the addition operation and the subtraction operation.

7. The stream cipher cryptosystem of claim 6 wherein the pseudo-random selection of the encryption combiner is based on a transform of an output from the encryption pseudo-random number generator.

8. The stream cipher cryptosystem of claim 5 wherein the means for controlling the encryption combiner selects between the addition operation and the subtraction operation according to the amount of text currently processed.

9. The stream cipher cryptosystem of claim 5 wherein the means for controlling the decryption combiner pseudo-randomly selects between the addition operation and the subtraction operation.

10. The stream cipher cryptosystem of claim 6 wherein the pseudo-random selection of the decryption combiner is based on a transform of an output from the encryption pseudo-random number generator.

11. The stream cipher cryptosystem of claim 5 wherein the means for controlling the decryption combiner selects between the addition operation and the subtraction operation according to the amount of text currently processed.

12. The stream cipher cryptosystem of claim 1 wherein the encryption combiner and the decryption combiner are implemented in software and the first and second one's complement operations are performed with two's complement arithmetic wherein:
    if the one's complement operation is addition, the addition is performed by a two's complement addition and then adding a constant with an ADD WITH CARRY instruction to convert the two's complement answer to a one's complement answer; and
    if the one's complement operation is subtraction, the subtraction is performed by a two's complement subtraction and then subtracting a constant with a SUBTRACT WITH BORROW instruction to convert the two's complement answer to a one's complement answer.

13. A stream cipher cryptosystem comprising:

a pseudo-random number generator receiving a key and providing a keystream; and a cryptographic combiner receiving a first binary data sequence and the keystream and performing a one's complement operation on the first binary data sequence and the keystream to produce a second binary data sequence.

14. The stream cipher cryptosystem of claim 13 wherein the cryptographic combiner is an encryption combiner and the first binary data sequence is a plaintext binary data sequence and the second binary data sequence is a ciphertext binary data sequence.

15. The stream cipher cryptosystem of claim 13 wherein the cryptographic combiner is a decryption combiner and the first binary data sequence is a ciphertext binary data sequence and the second binary data sequence is a plaintext binary data sequence.

16. The stream cipher cryptosystem of claim 13 wherein the one's complement operation is a one's complement addition operation.

17. The stream cipher cryptosystem of claim 13 wherein the one's complement operation is a one's complement subtraction operation.

18. The stream cipher cryptosystem of claim 13 further comprising:

means for controlling the cryptographic combiner to select the one's complement operation from an addition operation and a subtraction operation.

19. The stream cipher cryptosystem of claim 18 wherein the means for controlling the cryptographic combiner pseudo-randomly selects between the addition operation and the subtraction operation.

20. The stream cipher cryptosystem of claim 19 wherein the pseudo-random selection of the cryptographic combiner is based on a transform of an output from the pseudo-random number generator.

21. The stream cipher cryptosystem of claim 19 wherein the means for controlling the cryptographic combiner selects between the addition operation and the subtraction operation according to the amount of text currently processed.

22. The stream cipher cryptosystem of claim 13 wherein the cryptographic combiner is implemented in software and the one's complement operations is an addition operation performed by a two's complement addition and then adding a constant with an ADD WITH CARRY instruction to convert the two's complement answer to a one's complement answer.

23. The stream cipher cryptosystem of claim 13 wherein the cryptographic combiner is implemented in software and the one's complement operations is a subtraction operation performed by a two's complement subtraction and then subtracting a constant with a SUBTRACT WITH BORROW instruction to convert the two's complement answer to a one's complement answer.

24. A method of encrypting a plaintext binary data sequence, the method comprising the steps of:

generating a pseudo-random bit encryption keystream as a function of a key; and combining the plaintext binary data sequence and the encryption keystream with a one's complement operation to provide a ciphertext binary data sequence.

25. The method of claim 24 wherein the one's complement operation is a one's complement addition operation.

26. The method of claim 24 wherein the one's complement operation is a one's complement subtraction operation.

27. The method of claim 24 further comprising the step of:

selecting the one's complement operation from an addition operation and a subtraction operation.

28. The method of claim 27 wherein the selecting step pseudo-randomly selects between the addition operation and the subtraction operation.

29. The method of claim 24 wherein the combining step is implemented in software and the one's complement operations is an addition operation performed with the following steps:

performing two's complement addition; and adding a constant with an ADD WITH CARRY instruction to convert the two's complement answer to a one's complement answer.

30. The method of claim 24 wherein the combining step is implemented in software and the one's complement operations is a subtraction operation performed with the following steps:

performing two's complement subtraction; and subtracting a constant with a SUBTRACT WITH BORROW instruction to convert the two's complement answer to a one's complement answer.

31. A method of decrypting a ciphertext binary data sequence, the method comprising the steps of:

generating a pseudo-random bit decryption keystream as a function of a key; and combining the ciphertext binary data sequence and the decryption keystream with a one's complement operation to provide a plaintext binary data sequence.

32. The method of claim 31 wherein the one's complement operation is a one's complement addition operation.

33. The method of claim 31 wherein the one's complement operation is a one's complement subtraction operation.

34. The method of claim 31 further comprising the step of:

selecting the one's complement operation from an addition operation and a subtraction operation.

35. The method of claim 34 wherein the selecting step pseudo-randomly selects between the addition operation and the subtraction operation.

36. The method of claim 31 wherein the combining step is implemented in software and the one's complement operations is an addition operation performed with the following steps:

performing two's complement addition; and adding a constant with an ADD WITH CARRY instruction to convert the two's complement answer to a one's complement answer.

37. The method of claim 31 wherein the combining step is implemented in software and the one's complement operations is a subtraction operation performed with the following steps:

performing two's complement subtraction; and subtracting a constant with a SUBTRACT WITH BORROW instruction to convert the two's complement answer to a one's complement answer.

* * * * *